United States Patent
Xu

(10) Patent No.: US 8,888,645 B2
(45) Date of Patent: Nov. 18, 2014

(54) SIMPLE PLANETARY GEARSET CONTINUOUSLY VARIABLE TRANSMISSION

(75) Inventor: Hai Xu, Northville, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 85 days.

(21) Appl. No.: 13/562,629

(22) Filed: Jul. 31, 2012

(65) Prior Publication Data
US 2014/0038761 A1    Feb. 6, 2014

(51) Int. Cl.
*F16H 37/02* (2006.01)

(52) U.S. Cl.
USPC ............ 475/217; 475/207; 475/214; 475/216

(58) Field of Classification Search
USPC .................................. 475/207, 214, 216, 217
See application file for complete search history.

(56) References Cited

U.S. PATENT DOCUMENTS

| | | | | |
|---|---|---|---|---|
| 6,063,002 A | * | 5/2000 | Nobumoto et al. | 477/41 |
| 6,117,037 A | * | 9/2000 | Yamazaki | 475/216 |
| 6,254,504 B1 | * | 7/2001 | Goi et al. | 475/216 |
| 6,520,884 B2 | * | 2/2003 | Ooyama | 475/216 |
| 6,569,051 B2 | * | 5/2003 | Hirano et al. | 475/208 |
| 6,616,564 B2 | * | 9/2003 | Shibukawa | 475/216 |
| 2002/0128110 A1 | * | 9/2002 | Shibukawa | 475/214 |
| 2013/0130859 A1 | * | 5/2013 | Lundberg et al. | 475/214 |

OTHER PUBLICATIONS

Pending U.S. Appl. No. 13/301,159, filed Nov. 21, 2011, by Xu et al. All pages.

* cited by examiner

*Primary Examiner* — Derek D Knight

(57) ABSTRACT

A CVT is provided that includes an input member, an output member, an input disk rotationally coupled to the input member, an output disk having an output gear, a roller disposed between the input disk and the output disk and configured to transfer torque from the input disk to the output disk, a counter gear intermeshed with the output gear, and a planetary gear set connected to the output member. The planetary gear set includes a ring gear, a carrier member, and a sun gear. The ring gear is rotationally coupled to the counter gear. The counter gear and the planetary gear set are co-planar with the output disk.

16 Claims, 1 Drawing Sheet

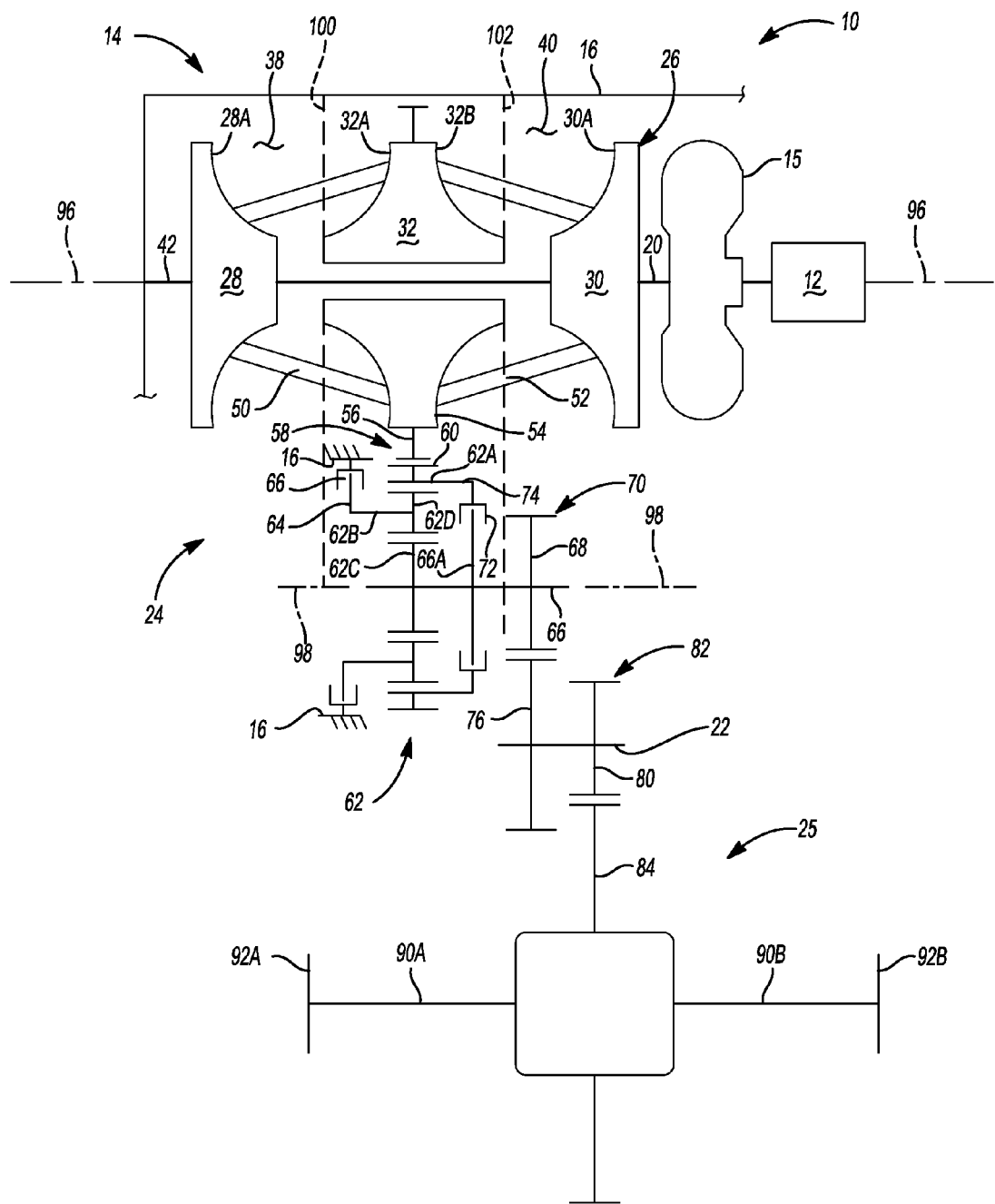

SIMPLE PLANETARY GEARSET CONTINUOUSLY VARIABLE TRANSMISSION

FIELD

The present disclosure relates to automatic transmissions and more particularly to a continuously variable transmission having a simple planetary gearset arrangement.

BACKGROUND

The statements in this section merely provide background information related to the present disclosure and may or may not constitute prior art.

A continuously variable transmission ("CVT") typically includes gearing that operatively couples a variator between a rotary power source, such as an engine or electric motor, and a final drive unit. The variator includes a rotary input disk and a rotary output disk which are able to steplessly or continuously vary the ratio of an input speed to an output speed (the "variator ratio"). The overall speed ratio provided by the CVT is a function of the variator ratio and the associated gearing. The output disc includes external gear teeth that are in mesh with and drive a corresponding gear. The gear in turn is functionally coupled to an output shaft or layshaft that is functionally coupled to the final drive unit.

Transmission axial length and mass significantly impact its power density and efficiency. Accordingly, there is a constant need for improved CVT designs that minimize axial length and mass while providing sufficient performance characteristics.

SUMMARY

A CVT is provided that includes an input member, an output member, an input disk rotationally coupled to the input member, an output disk having an output gear, a roller disposed between the input disk and the output disk and configured to transfer torque from the input disk to the output disk, a counter gear intermeshed with the output gear, and a planetary gear set connected to the output member. The planetary gear set includes a ring gear, a carrier member, and a sun gear. The ring gear is rotationally coupled to the counter gear. The counter gear and the planetary gear set are co-planar with the output disk.

In one example of the present invention the planetary gear set is nested radially within the counter gear.

In another example of the present invention the counter gear is integrally formed with the ring gear or connected to the ring gear.

In another example of the present invention the CVT further comprises a brake for selectively connecting the carrier member of the planetary gear set to a stationary member.

In another example of the present invention the CVT further comprises a clutch for selectively connecting the ring gear with the sun gear.

In another example of the present invention the CVT further comprises a first drive gear connected for common rotation with the sun gear and a first driven gear intermeshed with the first drive gear, and wherein the first driven gear is coupled to the output member.

In another example of the present invention the CVT further comprises a second drive gear coupled to the output member and a second driven gear intermeshed with the second drive gear.

In another example of the present invention the planetary gear set is a simple planetary gear set.

In another example of the present invention the output disk includes a central distal portion and wherein the output gear is disposed along the periphery of the central distal portion.

Further areas of applicability will become apparent from the description provided herein. It should be understood that the description and specific examples are intended for purposes of illustration only and are not intended to limit the scope of the present disclosure.

DRAWING

The drawing described herein is for illustration purposes only and is not intended to limit the scope of the present disclosure in any way.

The drawing is a schematic diagram of a powertrain for a motor vehicle having a CVT according to the principles of the present invention.

DETAILED DESCRIPTION

The following description is merely exemplary in nature and is not intended to limit the present disclosure, application, or uses.

With reference to the drawing, a powertrain for a motor vehicle is generally indicated by reference number 10. The powertrain 10 generally includes an engine 12 interconnected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 supplies a driving torque to the transmission 14 through, for example, a flexplate (not shown) or other connecting device or a starting device 15 such as a hydrodynamic device or launch clutch.

The transmission 14 is a toroidal-type continuously variable transmission (CVT). It should be appreciated that the transmission 14 may be a toroidal-type infinitely variable transmission (IVT) without departing from the scope of the present invention. The transmission 14 includes a typically cast, metal housing 16 which encloses and protects the various components of the transmission 14. The housing 16 includes a variety of apertures, passageways, shoulders and flanges which position and support these components. Generally speaking, the transmission 14 includes a transmission input shaft 20 and a transmission output shaft 22. Connected between the transmission input shaft 20 and the transmission output shaft 22 is a gearbox 24 configured to provide forward and reverse speed or gear ratios between the transmission input shaft 20 and the transmission output shaft 22. The transmission input shaft 20 is functionally interconnected with the engine 12 and receives input torque or power from the engine 12. The transmission output shaft 22 is preferably connected with a final drive unit 25. The transmission output shaft 22 provides drive torque to the final drive unit 25.

The transmission 14 generally includes three transfer gear sets, a simple planetary gear assembly, a clutch, a brake, a variator and several shafts, quills or other drive members. For example the transmission 14 includes a variator 26. The variator 26 is illustrated as a toroidal race rolling type variator. However, it should be appreciated that various other types of variators may be employed without departing from the scope of the present invention. The variator 26 includes a first input disc 28 and a second input disc 30. The first input disk 28 includes a toroidal outer surface or first input race 28A and the second input disk 30 includes a toroidal outer surface or second input race 30A. Disposed between the first and second input races 28A, 30A is an output disk 32. The output disk 32 includes a toroidal outer surface or first output race 32A and a toroidal outer surface or second output race 32B. The first output race 32A is disposed opposite the first input race 28A and the second output race 32B is disposed opposite the second input race 30A. The first input race 28A and the first output race 32A cooperate to define a first toroidal cavity 38 and the second input race 30A and the second output race 32B cooperate to define a second toroidal cavity 40. Each of the disks 28, 30, and 32 share a common rotational axis defined by a variator shaft 42. The variator shaft 42 is functionally interconnected to the transmission input shaft 20 and therefore receives drive torque from the engine 12. The input disks 28 and 30 are rotationally coupled to the variator shaft 42 and transfer drive torque to the output disk 32 via a plurality of rollers 50 and 52.

For example, the first cavity 38 includes the plurality of rollers 50 and second cavity 40 includes the plurality of rollers 52. Typically each of the first and second cavities 38 and 40 include two or three rollers 50 and 52, though it should be appreciated that any number of rollers may be employed without departing from the scope of the present invention. Each of the rollers 50, 52 are mounted for rotation about a roller axis and rolls upon the toroidal races 28A, 32A, 32B, and 30A of its associated input and output disks 28, 30, and 32 to transfer drive from the input disks 28 and 30 to the output disks 32. Changes in variator drive ratio are achieved by precession of the rollers 50, 52 such that the roller's axis is able to turn to change the inclination of the roller axis to the variator axis. Precession of the rollers 50, 52 results in changes of the radii of the paths traced upon the races 28A, 32A, 32B, and 30A by the rollers 50, 52 and hence result in a change of variator drive ratio between the input disks 28 and 30 and the output disk 32.

The output disk 32 includes a central, radially distal portion 54 disposed between the races 32A and 32B. The distal portion 54 includes a variator output or drive gear 56 of a first transfer gear pair 58. The drive gear 56 is connected to or integrally formed with the periphery of the distal portion 54 of the output disk 32. The drive gear 56 is intermeshed with a counter or driven gear 60 of the first transfer gear pair 58. The counter gear 60 of the first transfer gear pair 58 is coupled to and drives a ring gear 62A of a simple planetary gear assembly 62. The counter gear 60 may be connected to the ring gear 62A by a spline connection, weld, bolt, or pin, or may be integrally formed with the ring gear 62A. In addition the counter gear 60 may be axially offset slightly from the ring gear 62A. The simple planetary gear assembly 62 also includes a planet gear carrier 62B, a sun gear member 62C, and a plurality of planet gears 62D which are rotatably supported and carried in the planet gear carrier 62B. Each of the planet gears 62D is in constant mesh with the sun gear 62C and the ring gear 62A. The planet gear carrier 62B of the simple planetary gear assembly 62 is coupled through a first shaft, quill or member 64 to a friction brake 66. Activation of the friction brake 66 grounds the planet gear carrier 62B of the simple planetary gear assembly 62 to the housing 16.

The sun gear 62C is coupled through a second shaft, quill or drive member 66 to a first or drive gear 68 of a second transfer gear pair 70. An extension 66A of the third shaft, quill or drive member 66 is connected to one side of a friction clutch 72. The other side of the friction clutch 72 is connected through a third shaft, quill or drive member 74 to the ring gear 62A of the simple planetary gear assembly 62. Activation of the friction clutch 72 connects the first or drive gear 68 of the second transfer gear pair 70 to the ring gear 62A of the simple planetary gear assembly 62.

The first or drive gear 68 of the second transfer gear pair 70 is in constant mesh with a second or driven gear 76 which is disposed upon, coupled to and drives the transmission output member 22. In turn, the transmission output member 22 is coupled to and drives a final drive pinion gear 80 of a third transfer gear pair 82. The pinion gear 80 is in constant mesh with a final drive ring gear 84. The third transfer gear pair 82 is part of the final drive unit 25. The transfer gear 82 transfers the drive torque from the transmission 14 to axle or propshafts 90A and 90B which drive road wheels 92A and 92B, respectively.

To provide a Reverse gear ratio the brake 66 is engaged thereby fixing the planet gear carrier 62B from rotating. To provide a forward gear ratio the clutch 72 is engaged thereby connecting the ring gear 62A to the sun gear 62C. Specific gear ratios within forward and reverse are achieved by precession of the rollers 50 and 52, as previously described.

To minimize the axial packaging of the transmission 14, the simple planetary gear set 62 is co-planar with the output disk 32 of the variator 26 and is nested within the counter gear 60. For example the output disk 32 rotates about a first axis 96 and the simple planetary gear set 62 rotates about a second axis 98. The axes 96 and 98 are parallel to one another. The axial ends of the output disk 32 each define a imaginary planes 100 and 102 that intersect these axes 96, 98 at a right angle. The simple planetary gear set 62 is disposed on the axis 98 between the planes 100 and 102. With the simple planetary gear set 62 nested within the counter gear 60 the transmission 14 reduces cost and mass while reducing the axial length of the transmission 14.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission comprising:
   an input member;
   an output member;
   an input disk rotationally coupled to the input member;
   an output disk having an output gear connected at an outer periphery of the output disk;
   a roller disposed between the input disk and the output disk and configured to transfer torque from the input disk to the output disk;
   a counter gear intermeshed with the output gear;
   a planetary gear set connected to the output member, the planetary gear set having a ring gear, a carrier member, and a sun gear, wherein the ring gear is rotationally coupled to the counter gear; and
   a brake for selectively connecting the carrier member of the planetary gear set to a stationary member, and
   wherein the counter gear and the planetary gear set are co-planar with the output disk and wherein the planetary gear set is nested radially and axially within the counter gear.

2. The transmission of claim 1 wherein the counter gear is integrally formed with the ring gear.

3. The transmission of claim 1 further comprising a clutch for selectively connecting the ring gear with the sun gear.

4. The transmission of claim 3 further comprising a first drive gear connected for common rotation with the sun gear and a first driven gear intermeshed with the first drive gear, and wherein the first driven gear is coupled to the output member.

5. The transmission of claim 4 further comprising a second drive gear coupled to the output member and a second driven gear intermeshed with the second drive gear.

6. The transmission of claim 1 wherein the planetary gear set is a simple planetary gear set.

7. The transmission of claim 1 wherein the output disk includes a central distal portion and wherein the output gear is disposed along the periphery of the central distal portion.

8. A continuously variable transmission comprising:
an input member;
an output member;
an input disk rotationally coupled to the input member;
an output disk having an output gear, the output disk rotatable about a first axis of rotation;
a roller disposed between the input disk and the output disk and configured to transfer torque from the input disk to the output disk;
a counter gear intermeshed with the output gear;
a planetary gear set connected to the output member, the planetary gear set having a ring gear, a carrier member, and a sun gear, wherein the ring gear is rotationally coupled to the counter gear and wherein the planetary gear set is concentric with a second axis of rotation that is radially spaced apart from and parallel to the first axis of rotation;
a brake for selectively connecting the carrier member of the planetary gear set to a stationary member;
a clutch for selectively connecting the ring gear with the sun gear;
a first drive gear connected for common rotation with the sun gear;
a first driven gear intermeshed with the first drive gear and coupled to the output member,
wherein the output disk defines a first imaginary plane and a second imaginary plane that each intersect the second axis of rotation and wherein the counter gear and the planetary gear set are disposed along the second axis of rotation between the first and second imaginary planes.

9. The continuously variable transmission of claim 8 wherein the first and second imaginary planes are defined by axial ends of the output disk.

10. The continuously variable transmission of claim 9 wherein the first and second imaginary planes each intersect the second axis of rotation at a right angle to the second axis of rotation.

11. The continuously variable transmission of claim 8 wherein the planetary gear set is nested radially within the counter gear.

12. The continuously variable transmission of claim 8 wherein the counter gear is integrally formed with the ring gear.

13. The continuously variable transmission of claim 8 wherein the counter gear is connected to an outer surface of the ring gear by a bolt, pin, weld, or other connection.

14. The continuously variable transmission of claim 8 wherein the planetary gear set is a simple planetary gear set.

15. The continuously variable transmission of claim 8 further comprising a second drive gear coupled to the output member and a second driven gear intermeshed with the second drive gear.

16. A transmission comprising:
an input member;
an output member;
an input disk rotationally coupled to the input member;
an output disk having an output gear;
a roller disposed between the input disk and the output disk and configured to transfer torque from the input disk to the output disk;
a counter gear intermeshed with the output gear;
a planetary gear set connected to the output member, the planetary gear set having a ring gear, a carrier member, and a sun gear, wherein the ring gear is rotationally coupled to the counter gear;
a first drive gear connected for common rotation with the sun;
a first driven gear intermeshed with the first drive gear, and wherein the first driven gear is coupled to the output member, and
wherein the counter gear and the planetary gear set are co-planar with the output disk.

* * * * *